United States Patent
Naylor

(10) Patent No.: US 9,727,497 B2
(45) Date of Patent: *Aug. 8, 2017

(54) RESOLVING CONTENTION BETWEEN DATA BURSTS

(71) Applicant: Optis Circuit Technology, LLC, Plano, TX (US)

(72) Inventor: Rowan Nigel Naylor, Basingstoke (GB)

(73) Assignee: Optis Circuit Technology, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,001

(22) Filed: May 24, 2016

(65) Prior Publication Data

US 2016/0267033 A1   Sep. 15, 2016

Related U.S. Application Data

(63) Continuation of application No. 13/140,629, filed as application No. PCT/EP2008/068039 on Dec. 19, 2008, now Pat. No. 9,542,341.

(51) Int. Cl.
*G06F 13/00* (2006.01)
*G06F 13/16* (2006.01)
(Continued)

(52) U.S. Cl.
CPC ........ *G06F 13/1626* (2013.01); *G06F 13/362* (2013.01); *G06F 13/376* (2013.01); *G06F 13/4068* (2013.01)

(58) Field of Classification Search
None
See application file for complete search history.

(56) References Cited

U.S. PATENT DOCUMENTS 5,471,637 A    11/1995  Pawlowski et al.
5,668,975 A *   9/1997  Coddington ............ G06F 13/18
                                                        711/151

(Continued)

FOREIGN PATENT DOCUMENTS

EP    0619547 A1    10/1994
JP      76122       1/1995
(Continued)

OTHER PUBLICATIONS

International Preliminary Report on Patentability issued in corresponding International application No. PCT/EP2008/068039 on Jun. 21, 2011.

(Continued)

*Primary Examiner* — Elias Mamo
(74) *Attorney, Agent, or Firm* — Spencer C. Patterson; Grable Martin Fulton PLLC

(57) ABSTRACT

In an embedded system, there are a plurality of data requesting devices, a plurality of data sources and a bus fabric interconnecting the data requesting devices and the data sources, wherein the bus fabric comprises a plurality of bus components. Some or all of the data sources and arbitration devices associated with the bus components resolve contentions between data bursts by selecting a first one of the contending data bursts; determining a length of a critical section of the first selected data burst; and processing the critical section of the selected data burst. Then, a second one of the contending data bursts is selected, a length of a critical section of the second selected data burst is determined, and the critical section of the second selected data burst is processed before a non-critical section of the selected data burst.

20 Claims, 9 Drawing Sheets

(51) Int. Cl.
*G06F 13/376* (2006.01)
*G06F 13/362* (2006.01)
*G06F 13/40* (2006.01)

(56) References Cited

U.S. PATENT DOCUMENTS

| | | | |
|---|---|---|---|
| 5,923,857 | A | 7/1999 | Pawlowski et al. |
| 6,085,271 | A * | 7/2000 | Smith ............ G06F 13/362 710/113 |
| 6,272,601 | B1 * | 8/2001 | Nunez ............ G06F 12/0811 711/133 |
| 6,956,818 | B1 | 10/2005 | Thodiyil |
| 7,826,438 | B1 * | 11/2010 | Salhotra ............ H04L 1/188 370/345 |
| 2002/0073251 | A1 | 6/2002 | Yamamoto et al. |
| 2003/0095575 | A1 | 5/2003 | Annadurai |
| 2003/0161354 | A1 | 8/2003 | Bader et al. |
| 2004/0044812 | A1 * | 3/2004 | Holm ............ G06F 13/4018 710/110 |
| 2006/0074961 | A1 | 4/2006 | Kongalath et al. |
| 2008/0126613 | A1 * | 5/2008 | Gilgen ............ G06F 13/387 710/36 |

FOREIGN PATENT DOCUMENTS

| | | |
|---|---|---|
| JP | 2000285087 A | 10/2000 |
| JP | 2002222162 A | 8/2002 |

OTHER PUBLICATIONS

International Search Report for PCT/EP2008/068039 mailed Jun. 4, 2009.
Muthler, G. et al., "Instruction Fetch Deferral Using Static Slack", Microarchitecture, 2002, (MICRO-35), Proceedings of the 35th Annual IEEE/ACM International Symposium, Nov. 18-22, 2002, pp. 51-61, ISSN: 1072-4451; ISBN: 0-7695-1859-1.

* cited by examiner

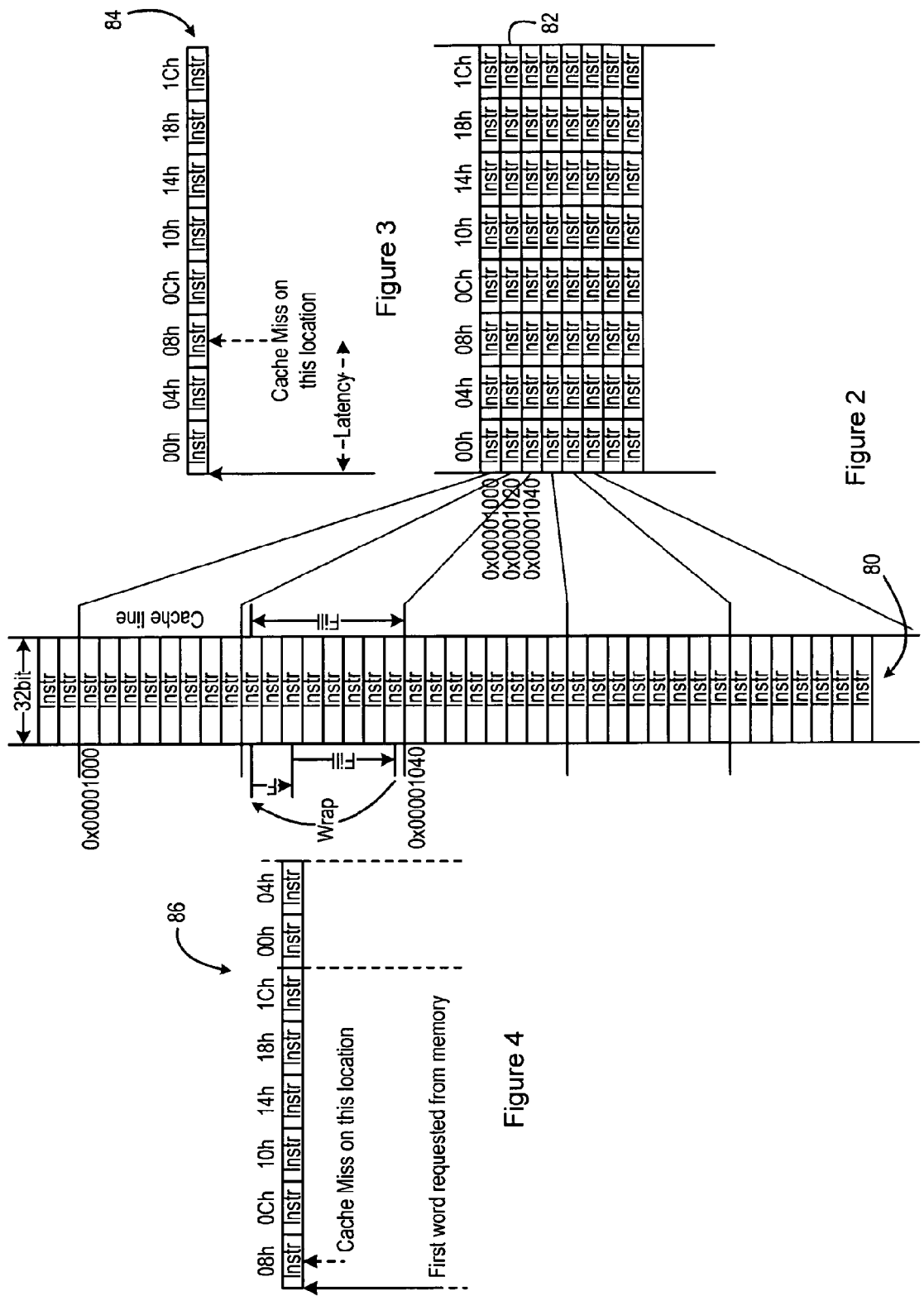

RESOLVING CONTENTION BETWEEN DATA BURSTS

TECHNICAL FIELD

This invention relates to a method of resolving contention between data bursts being transferred between devices in an electronic system, and to devices for use in such a system.

BACKGROUND

Embedded systems are known, in which there are multiple master devices, such as processors of various kinds, and multiple resource devices, such as different types of memory, all interconnected by a bus matrix, or bus fabric, made up of different component buses. In order for the embedded system to operate, data must be transferred between these devices, typically in data bursts that contain multiple data words. A common occurrence in such systems is that there will be multiple simultaneous requests for the use of a resource such as a memory device or a resource such as a component bus of the bus fabric.

In such cases, one transaction must be given a higher priority than the other transaction or other transactions, and this can result in the overall performance of the system being compromised.

U.S. Pat. No. 5,668,975 describes one approach to arbitration, in the specific case of multiple requests for data from a memory block. In the method described in this document, each requested data transfer is split into a critical word plus one or more non-critical word. Then, each of the critical words is given a higher priority than each of the non-critical words, and the critical words and the non-critical words are handled in their respective priority orders.

However, this document does not provide any solution to the additional problems that arise in embedded systems a described above, in which arbitration between requests may be required at multiple points.

SUMMARY

According to a first aspect of the present invention, there is provided a method of resolving contention between data bursts. A first one of the contending data bursts is selected, and a length of a critical section of the first selected data burst is determined. The critical section of the selected data burst is then processed. A second one of the contending data bursts is selected, and a length of a critical section of the second selected data burst is determined. The critical section of the second selected data burst is processed before a non-critical section of the selected data burst.

According to a second aspect of the present invention, there is provided an arbitration device operating in accordance with the method of the first aspect.

According to a third aspect of the present invention, there is provided a method of forming a data request in a data transfer system. According to this method, there is included in a request for a data burst a tag indicating a length of a critical section of the data burst.

According to a fourth aspect of the present invention, there is provided a data host operating in accordance with the method of the third aspect.

According to a fifth aspect of the present invention, there is provided a method of processing a data request in an embedded system comprising a plurality of hosts and a plurality of memory resources, interconnected by a plurality of bus components. In the host, a data request is formed, said data request identifying a memory resource from which the requested data is to be received, and also containing a tag indicating a length of a critical section of the data burst. In the identified memory resource, a burst transaction is formed, containing the requested data, and the burst transaction includes a second tag indicating a length of a critical section of the data burst. At at least one arbitration device associated with a respective one of said bus components, the burst transaction is split based on a value of the second tag, and a higher priority is given to the critical section of the data burst than to a non-critical section of the data burst.

According to a sixth aspect of the present invention, there is provided an embedded system, comprising a plurality of data requesting devices, a plurality of data sources and a bus fabric interconnecting the data requesting devices and the data sources, wherein the bus fabric comprises a plurality of bus components. The bus components have associated therewith respective arbitration devices, each in the form of an arbitration device operating in accordance with the method of the first aspect.

Embodiments of the invention therefore allow transactions to be performed with minimal delay to the critical sections of transactions, allowing account to be taken of the lengths of the critical sections.

Thus, in embodiments of the invention, metadata is added to requests in a data transaction in a complex system, aimed at allowing the system to better control and optimise important parameters and performance. Adding a tag that indicates a length of a critical section of a transaction removes from the bus fabric the need to continually update its setup and configuration on a real time basis. Rather, the requesting device tags this metadata to its requests rather than having to program the fabric in advance. Thus, the fabric, rather than being programmed with specific details, is given a 'policy', which it applies to all transactions, using the metadata in the tags to make the correct choices in real time. The policy can if necessary be modified in a much slower time frame, and need not be as detailed, and hence there is a lower burden on the system. Moreover, when moving a function or subsystem between different designs, it means a reduction in determining configurations and verification time, increasing reusability.

BRIEF DESCRIPTION OF THE DRAWINGS

FIG. 2 is a schematic representation of an instruction memory in a system of the type shown in FIG. 1, illustrating possible forms of transaction.

FIG. 3 shows a first transaction associated with the instruction memory of FIG. 2.

FIG. 4 shows a second transaction associated with the instruction memory of FIG. 2.

DETAILED DESCRIPTION

Figure 1:
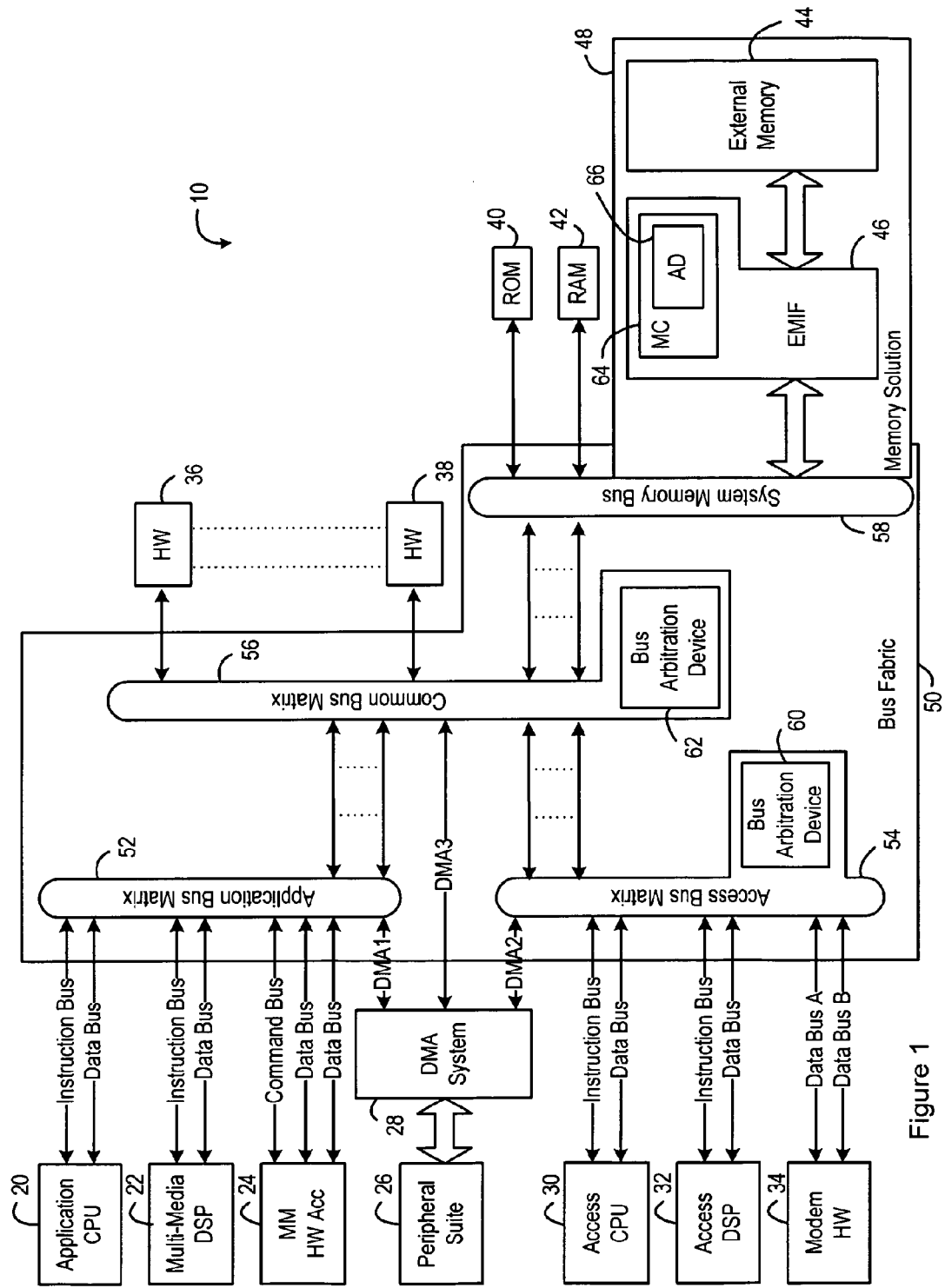
FIG. 1 is a block schematic diagram of an embedded system in accordance with an aspect of the invention.

FIG. 1 shows a typical embedded system, in which the present invention can be applied. The system shown in FIG. 1 is presented only as an example, and it will be appreciated that the details of the system are not limiting, in that the invention can be applied in many other systems of different types.

In more detail, FIG. 1 shows an embedded system 10, for example of a type that may be present in a mobile communications device. The system 10 includes multiple data masters, or hosts, that may for example be in the form of processing devices that run code and perform operations on data received from elsewhere. As shown in FIG. 1, these data masters are an application CPU 20, a multi-media DSP 22, a multi-media (MM) hardware (HW) accelerator 24, devices shown collectively as a peripheral suite 26 connected through a direct memory access (DMA) system block 28, an access CPU 30, an access DSP 32, and modem hardware 34. The system 10 may also include other hardware (HW) blocks 36, ..., 38. It will be appreciated that each of the hosts may include multiple data requesters, in the form of software or hardware sub-components.

Data and instructions are stored in a variety of memory devices, such as a ROM 40, RAM 42, and an external memory 44, connected through an external memory interface (EMIF) 46, the external memory 44 and external memory interface 46 together being referred to as a memory solution 48. Again, it will be appreciated that any memory device or memory mapped device may include multiple data sources.

These various blocks are interconnected by a bus fabric, or bus matrix, 50. That is, there is not a single bus to which all of the blocks are connected. Rather, the bus fabric 50 includes multiple bus components, identified in FIG. 1 as an application bus matrix 52, an access bus matrix 54, a common bus matrix 56, and a system memory bus 58.

In this illustrative example, the application CPU 20, the multi-media DSP 22, the multi-media (MM) hardware (HW) accelerator 24, and the direct memory access (DMA) system block 28 are connected by respective bus segments to the application bus matrix 52. The direct memory access (DMA) system block 28, the access CPU 30, the access DSP 32, and the modem hardware 34 are connected by respective bus segments to the access bus matrix 54. The ROM 40, the RAM 42, and the external memory interface (EMIF) 46 are connected by respective bus segments to the system memory bus 58. The direct memory access (DMA) system block 28, and the other hardware (HW) blocks 36, ..., 38, together with the application bus matrix 52, the access bus matrix 54, and the system memory bus 58, are connected by respective bus segments to the common bus matrix 56. It will therefore be noted that a connection between any two of the component blocks of the embedded system 10 will have to pass over multiple bus segments. In particular, it will be also be noted that, because each of the application bus matrix 52, the access bus matrix 54, and the system memory bus 58, are connected by multiple respective bus segments to the common bus matrix 56, there will be many possible paths over which the connections might be made.

This example therefore demonstrates that, as resources are shared, there are many points at which there might be contention for the available resources between required data transfers. For example, multiple data bursts might require access to a particular bus, or bus component, at the same time. As another example, the external memory might receive multiple requests for data from multiple sources at the same time. The resolution of such contentions is described in more detail below.

Data contentions at a bus, or bus component, can for example be resolved by means of a bus arbitration device associated with the bus or bus component. For example, FIG. 1 shows a first bus arbitration device 60 included within the access bus matrix 54, and a second bus arbitration device 62 included within the common bus matrix 56. FIG. 1 also shows a memory controller (MC) 64 forming part of the external memory interface 46, and the memory controller 64 includes an arbitration device (AD) 66.

The invention is described herein with reference to a cache-based system, in which a delay in providing data or instructions to a processing block can result in an increased latency of the system as a whole, or of a part of the system.

FIG. 2 illustrates the structure of data in this illustrated embodiment of the invention.

Specifically, FIG. 2 shows the instruction memory 80, it being appreciated that a structure of a memory containing data might be essentially the same. The instruction memory 80 is 32 bits wide, and stores instructions in groups of eight lines, with each group of eight lines forming a 32 byte block that contains a cache line. Thus, the cache line with a starting address of 0x00001020 is formed from the instruction memory lines with the starting addresses of 0x00001020, 0x00001024, 0x00001028, 0x0000102C, 0x00001030, 0x00001034, 0x00001038, and 0x0000103C. In this exemplary embodiment, a memory request always uses a complete cache line.

FIG. 2 illustrates the situation where there is a cache miss at the location 0x0000102A, that is, this is the first word that is required from the memory. As mentioned above, the entire cache line 82 that contains this memory location must be requested.

FIG. 3 shows the situation where this cache line is requested as a standard non-wrapping line 84. That is, the whole cache line is requested in order of the memory locations. The indicated latency period is the period from the start of the cache line until the location of the cache miss.

FIG. 4 shows the situation where this cache line is requested as a wrapping burst 86 with the critical word first. That is, the whole cache line is requested as before, but the critical word, starting at the address 0x00001028, is the first word requested from the memory. The latency period is therefore reduced in this case, as it is only the period from the start of the critical word until the location of the cache miss. In wrapping bursts, the section of the burst from the start word to the end of the cache line is critical to the execution of the instructions, while the wrapped section from start of the cache line to the start of the critical word is in general not critical.

Thus, this invention relates in particular, though not exclusively, to systems for satisfying the needs of cache based CPUs that frequently generate burst transaction requests to the system to either service cache misses or write-back of dirty data lines to main memory. In such systems, performance can be improved by reducing latency on the cache line fills specifically, for both data and code. Assuming the burst is arranged as critical words first, the amount of the burst that is critical remains processor dependent. The object of critical word first is to provide what the processor needs with minimum latency. In the case of data, it may be one or two words of a burst of 16, in code it may be many more.

For processor data transactions, a demand for a specific value which is processed means two things. Firstly, only a small amount are needed per instruction and, secondly, not all instructions require external data. As a result, the need for a burst of data is spread over many instructions. This means that, in a burst, the first word is generally critical but subsequent data in the burst is less so; the execution of intervening instructions allows subsequent data to be read or written at a more relaxed rate and not require to be prioritized as the first word.

In the case of instructions, these are executed sequentially and rapidly, the high speed leading to improved performance. However code execution is changed by jumps and branches that may occur frequently in the code. As a result a burst transaction for a cache miss on instructions means that, in a critical word first burst, it is not only the first word that is critical but a number of sequential words in the burst. Given the sequential nature of code, the number of critical words is at a maximum up to the point where the burst wraps and may be less, determined by the frequency of jumps or branches in the code. In this case the critical split point can be placed at the point where the burst wraps around to complete the burst with data words from before the critical word.

In the case of other types of processor that generate bursts other than cache fill or write-back, the point at which data ceases to be critical can be determined based on other criteria, as discussed in more detail below.

Figure 5:
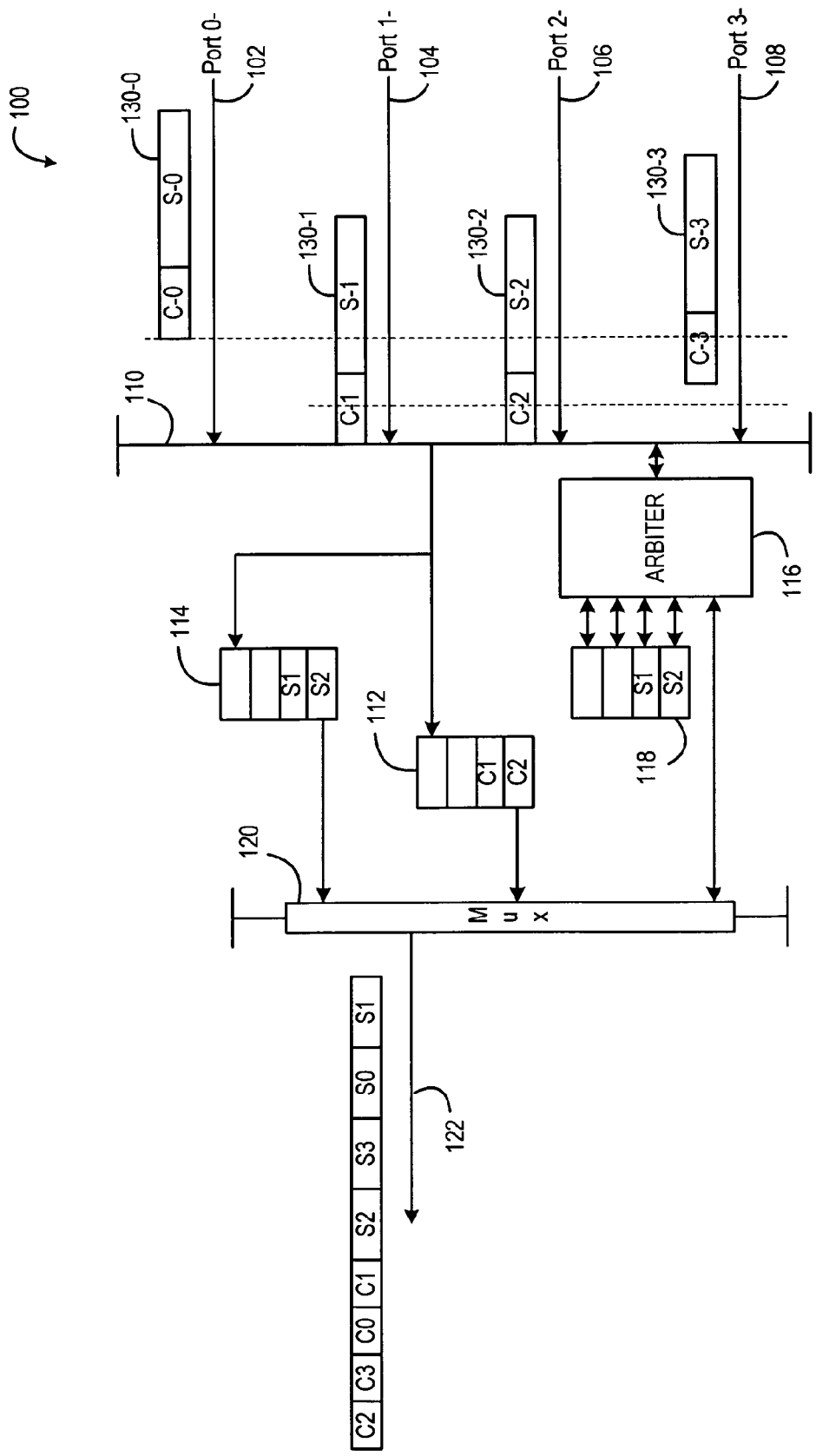
FIG. 5 is a schematic representation of a bus arbitration device in accordance with an aspect of the invention.

FIG. 5 is a schematic diagram, showing the general form of a bus arbitration device in accordance with an embodiment of the invention. For example, the bus arbitration device 100 may be associated with any of the buses or component buses shown in FIG. 1, and may be located at any point in the system where contending data bursts can be received, for example from multiple sources, controlling the access of the data bursts to a shared resource such as a bus. It will be appreciated that an essentially similar device can be implemented as part of a memory controller associated with a shared memory resource, in order to determine how various contending data requests should be processed.

The bus arbitration device 100 is shown in FIG. 5 as having four input ports 102, 104, 106, 108, referred to as Port 0, Port 1, Port 2 and Port 3 respectively, multiplexed into the arbitration device through a multiplexer 110. Connected to the multiplexer 110 are a first memory 112 and a second memory 114. Also connected to the multiplexer 110 is an arbiter 116, which performs an arbitration control process described in more detail below. Pointers to data can be stored in the first memory 112 and the second memory 114 in accordance with the process performed in the arbiter 116. Counters 118 are associated with the arbiter 116. The first memory 112 and the second memory 114 are connected through a further multiplexer 120 to an output path 122. In this illustrative example, the output path 120 may be a bus (or a connection to a bus), such that the bus arbitration device 100 is able to resolve contentions between data bursts that require access to the bus.

Figure 6:
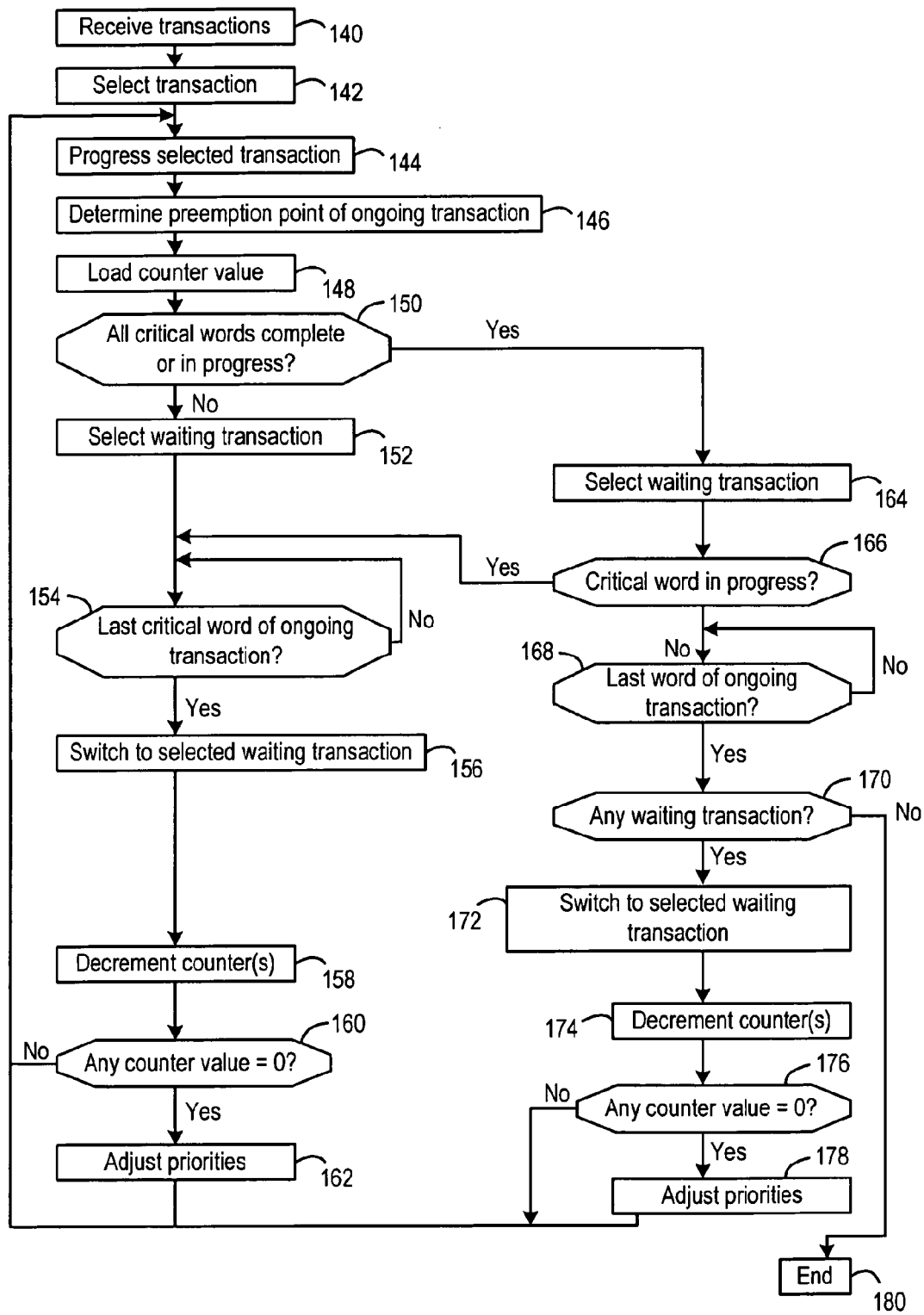
FIG. 6 is a flow chart illustrating a method performed in the bus arbitration device of FIG. 5.

FIG. 6 is a flow chart, illustrating one exemplary process in accordance with an aspect of the invention, that can be performed in the arbiter 116. It will be appreciated that many other somewhat similar processes can be performed, omitting some of the steps shown in FIG. 6 and/or including other steps and/or changing the order of the illustrated steps.

In step 140 of the process shown in FIG. 6, multiple transactions are received, or have been received, by the bus arbitration device 100. In step 142, one of these transactions is selected, based for example on priorities assigned to the transactions by any convenient mechanism.

In step 144, the selected transaction is allowed to proceed in a conventional manner, while other pending transactions are forced to wait.

In step 146, while the selected transaction is in progress, the arbiter 116 determines at which word it would be possible to preempt the sequence, that is, to split the transaction into a critical section and a non-critical section. Different ways in which this can be achieved are described in more detail below. However, it will be noted at this point that the arbiter 116 may determine the length of the critical section, and hence the point at which the transaction may be split, either by performing some analysis of its own, or by relying on analysis performed elsewhere and reading a tag that forms part of the transaction.

In step 148, a value is loaded into one of the counters 118, associated with the selected transaction.

In step 150, it is determined whether there are any pending transactions, progress of whose critical sections has not been started, or whether the critical sections of all pending transactions are completed or in progress. If it is determined in step 150 that there are pending transactions whose critical sections have not been progressed, the process passes to step 152, in which another of these waiting transactions is selected, again for example on the basis of priorities assigned to the transactions. Selecting a waiting transaction means that the process can continue without introducing additional latency when a switch of transactions is performed.

In step 154, it is determined whether the last critical word of the present ongoing transaction has been reached, and this step is repeated until the last critical word has been processed.

When the last critical word of the present ongoing transaction has been reached, this transaction is forced to wait. For example, the unprocessed non-critical section of the transaction may be stored in the bus arbitration device 100. As an alternative, the bus arbitration device 100 can send a wait signal back to the source of the transaction, forcing that source to delay sending the non-critical section of the transaction, or to resend the non-critical section of the transaction, after a delay.

The process is switched in step 156 to the waiting transaction, e.g. the highest priority transaction, selected in step 152.

When such a switch is performed, any counter value(s) loaded in any performance of step 148 is decremented by one in step 158, and it is tested in step 160 whether any of these counter values has thereby reached zero. If so, the priority of the transaction associated with that counter value is increased in step 162. For example, that transaction may automatically be given the highest priority of all of the waiting transactions, so that this mechanism establishes a maximum time that a transaction can be forced to wait.

After adjustment of the priority or priorities in step 162, or after a determination in step 160 that no counter value has reached zero, the process returns to step 144, in which the waiting transaction selected in step 152 is progressed.

When it is determined in step 150 of any iteration that all received critical sections are either complete or in progress, the process turns to the progress of non-critical sections of received transactions, and specifically passes to step 164, in which the highest priority waiting transaction is selected.

The process then passes to step 166, in which it is determined whether a critical word is still in progress. If so, the process returns to step 154, and continues as described above. However, if a non-critical section is already in progress, the process passes to step 168, in which it is determined whether the last word of the present ongoing transaction has been reached, and this step is repeated until the last critical word has been processed.

When the last word of the present ongoing transaction has been reached, the process passes to step 170, in which it is determined whether there is any transaction that is being forced to wait. If not, the process passes to step 180, and ends.

If there is a waiting transaction, the process is switched in step 172 to the waiting transaction, e.g. the highest priority transaction, selected in step 164.

As before, when such a switch is performed, any counter value(s) loaded in any performance of step 148 is decremented by one in step 174, and it is tested in step 176 whether any of these counter values has thereby reached zero. If so, the priority of the transaction associated with that counter value is increased in step 178. For example, that transaction may automatically be given the highest priority of all of the waiting transactions, so that this mechanism establishes a maximum time that a transaction can be forced to wait.

After adjustment of the priority or priorities in step 178, or after a determination in step 176 that no counter value has reached zero, the process returns to step 144, in which the transaction to which progress was switched in step 172 is progressed further.

Thus, all existing transactions are completed in priority order. In addition, all new transactions occurring while existing transactions are being serviced are added to the queue and evaluated as described above.

In this exemplary embodiment, it is assumed that the critical sections of all transactions are given a higher priority than the all non-critical sections. However, it is also possible that, once the length of the critical section of a transaction has been determined, the non-critical section of that transaction is nevertheless given a higher priority than the critical section of at least one other transaction, in view of the priority given to that transaction generally, for example.

As described so far, it is assumed that all of the transactions are from different processors. While not impossible, it may be undesirable to interleave two transactions from the same processor, and so additional steps can be taken to avoid this possibility.

Figure 7:
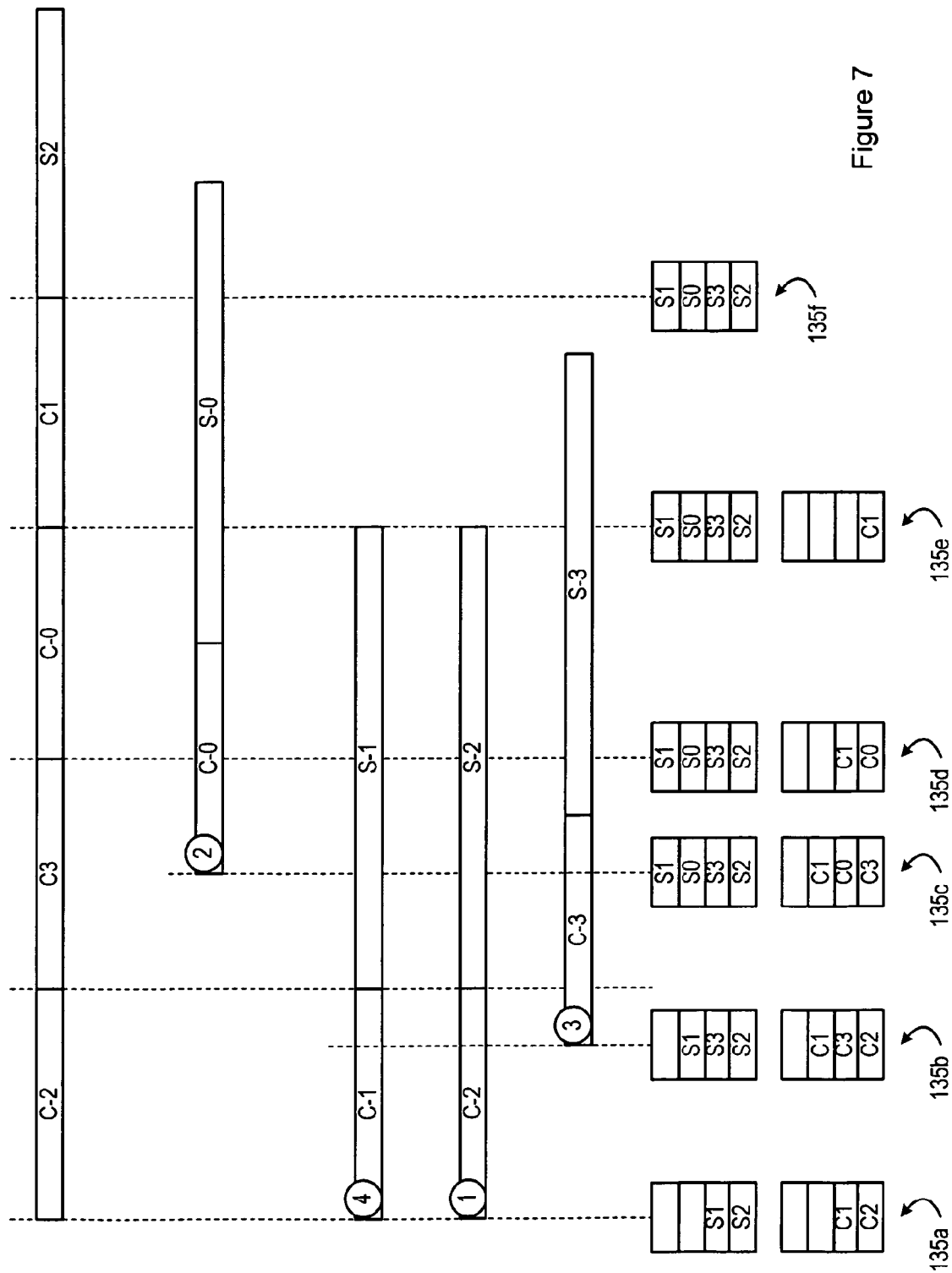
FIG. 7 is an illustration of a result of performing the method of FIG. 6.

FIG. 7 illustrates how the system described above operates in practice, while FIG. 5 illustrates the status of the bus arbitration device 100 at one point in the process. Specifically, FIG. 5 shows the situation where transactions 130-1 and 130-2 have been received by the bus arbitration device 100 on its Port 1 and Port 2 ports 104, 106 respectively, and transactions 130-0 and 130-3 will shortly be received by the bus arbitration device 100 on its Port 0 and Port 3 ports 102, 108 respectively.

In this case, the transaction 130-1 has been received, and it has been determined that it is made up of a critical section C-1 and a non-critical S-1, and the transaction 130-2 has been received, and it has been determined that it is made up of a critical section C-2 and a non-critical section S-2. Pointers to the critical sections C-1, C-2 are placed in the memory 112, while pointers to the non-critical sections S-1, S-2 are placed in the memory 114, as shown at 135a in FIG. 7.

The data can be stored but, in this illustrated example, the data is not stored. Rather, the connections are made to wait, until they can be progressed.

In this illustrative example, it has been determined that the transaction 130-2 is of higher priority than the transaction 130-1, and so FIG. 5 shows the critical section C-2 of the transaction 130-2 being the first to be output on the path 122.

In the example shown in FIG. 5, the transaction 130-3 arrives on the input 108 before the critical section C-2 of the transaction 130-2 has been completed, and the transaction 130-0 arrives shortly thereafter. Both of these transactions are determined to be of higher priority than the transaction 130-1 and so, after determining the lengths of the critical sections C-3, C-0 of the transactions 130-3, 130-0, the pointers to the critical sections and non-critical sections of these transactions are stored in the memories 112, 114, with the memory contents after the arrival of the transaction 130-3 being shown by 135b in FIG. 7, and the memory contents after the arrival of the transaction 130-0 and after the completion of the critical section C-2 being shown by 135c in FIG. 7, it is these C-3, C-0 that are output next on the path 122, followed by the critical section C-1 of the transaction 130-1, with the contents of the memories 112, 114 after the completion of each of these critical sections being shown by 135d, 135e, 135f respectively in FIG. 7. These are then followed by the non-critical sections S-2, S-3, S-0, S-1 in the same priority order.

Figure 8:
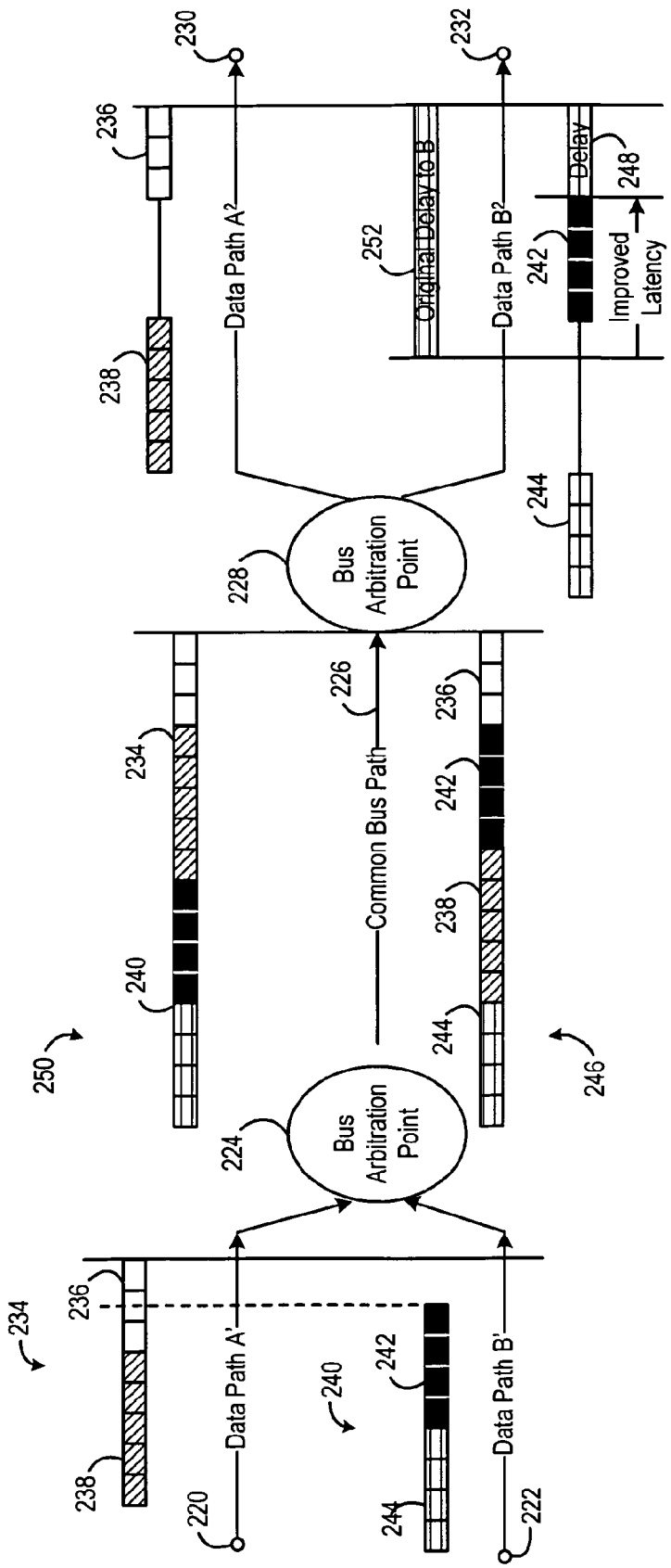
FIG. 8 is another illustration of a result of performing the method of FIG. 6.
Figure 9:
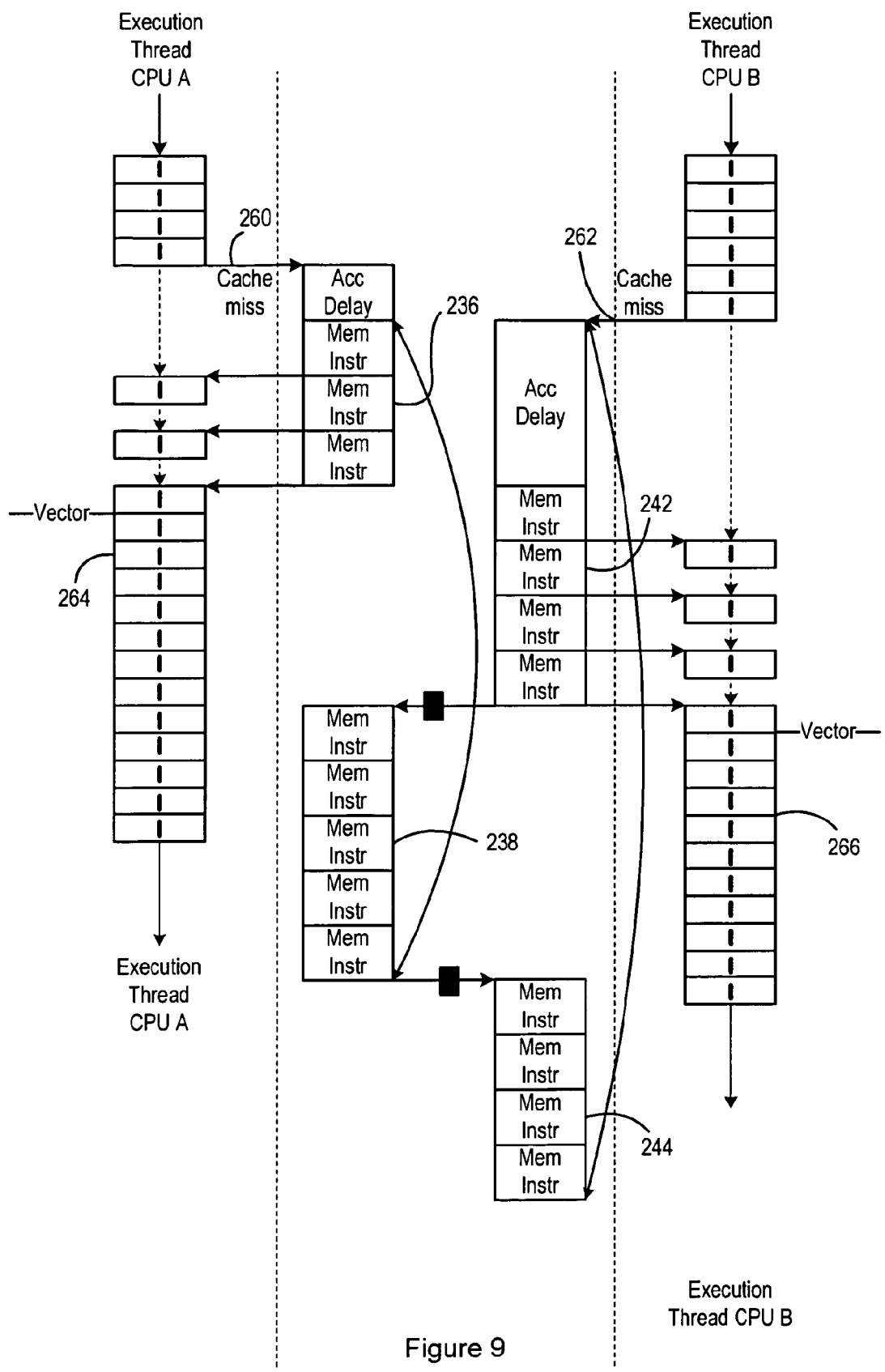
FIG. 9 is a further illustration of a result of performing the method of FIG. 6.

FIGS. 8 and 9 illustrate the way in which the contention resolution system may operate by way of a simplified example in which two transactions are passing through an arbitration point and over a common bus path.

FIG. 8 shows a situation where data is being passed from two different sources 220, 222 over respective data paths Data Path $A^1$ and Data Path $B^1$ to a first bus arbitration point 224. The two data transactions are then passed over a Common Bus Path 226 to a further bus arbitration point 228, where they are divided again, and sent on their respective data paths Data Path $A^2$ and Data Path $B^2$ to their respective processors 230, 232.

The first transaction 234 for the first processor 230 is made up of a critical section 236 and a non-critical section 238. The second transaction 240 for the second processor 232 is made up of a critical section 242 and a non-critical section 244.

FIG. 8 shows at 246 the operation of the pre-emptive arbitration scheme described above, in which the critical section 236 of the first transaction 234 is sent first, followed by the critical section 242 of the second transaction 240, then the non-critical section 238 of the first processor 230, and the non-critical section 244 of the second transaction 240.

The times at which the data reach the processors 230, 232 are represented in FIG. 8 by the horizontal positions of the data words relative to the data paths Data Path $A^2$ and Data Path $B^2$. Thus, it can be seen that the critical section 242 of the second transaction 240 reaches the second processor 232 after a delay 248, relative to the time at which the critical section 238 of the first transaction 234 reaches the first processor 230.

By way of comparison, FIG. 8 also shows at 250 by way of comparison the operation of a conventional arbitration scheme described above, in which the whole of the first transaction 234 is sent first followed by the whole of the second transaction 240. In that situation, it can be seen that the critical section 242 of the second transaction 240 would only reach the second processor 232 after the whole of the first transaction 234 has reached the first processor 230, i.e.

after a longer delay 252, relative to the time at which the critical section 236 of the first transaction 234 reaches the first processor 230.

Thus, the critical section 242 of the second transaction 240 suffers a shorter delay, when the pre-emptive arbitration scheme described above is used. Although this is at the expanse of a longer delay suffered by the noncritical section 238 of the first processor 230, this longer delay does not cause any delay in the operation of the processors themselves.

The reason for this is illustrated by FIG. 9, which illustrates the situation where the first and second transactions 234, 240 contain memory instructions.

As shown at 260, the execution thread of the first processor 230 (CPU A) reaches cache miss, requiring instructions to be fetched from the memory, and the critical section 236 of the first transaction is fetched after the shortest possible delay. Similarly, the execution thread of the second processor 232 (CPU B) reaches a cache miss at 262, requiring instructions to be fetched from the memory, and the critical section 242 of the second transaction is fetched as soon as the critical section 236 of the first transaction has been fetched.

As described above, but as also shown in FIG. 9, when the critical section 242 of the second transaction has been fetched, the noncritical section 238 of the first transaction is transmitted to the first processor and then the non-critical section 244 of the second transaction is transmitted to the second processor.

The execution thread running on the first processor (CPU A) can resume at full speed, as shown at 264, as soon as the processor has received the critical section 236 of the first transaction, and the additional delay in receiving the non-critical section 238 of the first transaction causes no delay in this execution thread. Meanwhile, the execution thread running on the second processor (CPU B) can resume at full speed, as shown at 266, as soon as the processor has received the critical section 242 of the second transaction, and so the reduced delay in receiving this is a significant advantage.

As described above, there is an advantage in processing the critical section of a transaction before a non-critical section, and there is an advantage for the system as a whole in splitting transactions, so that a critical section of one transaction is processed, and then a critical section of another transaction is processed before the non-critical section of the first transaction is processed.

In order to maximise this advantage, it is necessary to be able to identify as accurately as possible the length of the critical section, and this can be done in different ways.

Figure 10:
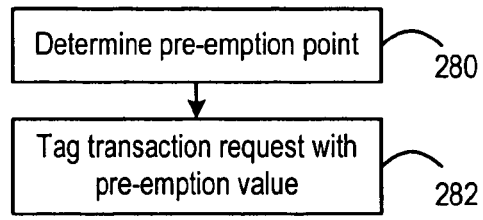
FIG. 10 is a flow chart illustrating a method performed in a first device in the system of FIG. 1.

In a first possibility, illustrated in FIG. 10, the length of the critical section is statically determined at the host, or an associated cache. A shown in step 280, the pre-emption point, that is, the point immediately after the critical section, is determined. Then, in step 282, the transaction request is tagged with this pre-emption value.

Figure 11:
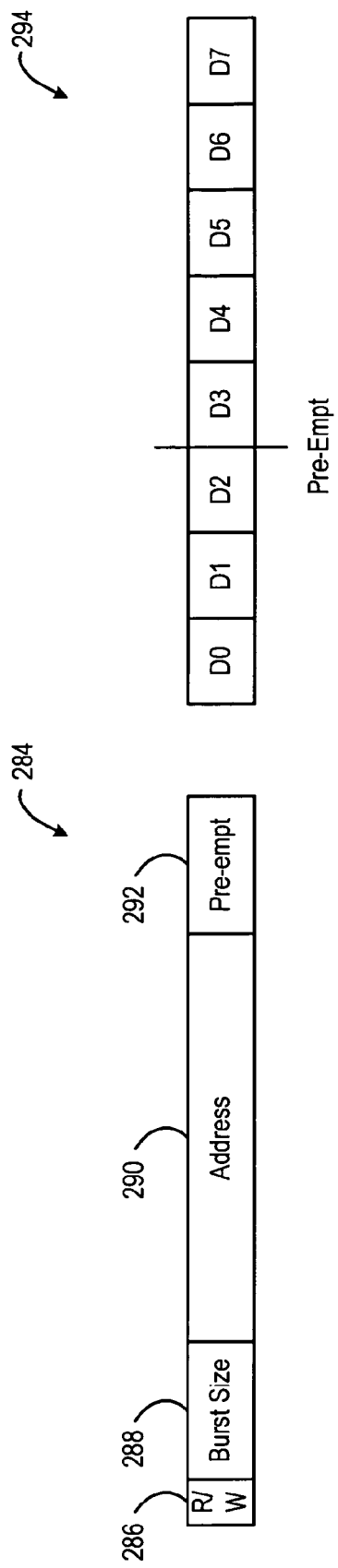
FIG. 11 is a schematic illustration of a data request generated in accordance with the method of FIG. 10.

Thus, as shown by way of example in FIG. 11, the transaction request 284 issued before the data burst contains, as is generally conventional and hence not described in more detail: a flag 286 indicating whether it is requesting a data read operation or signalling a data write operation; an indication 288 as to the burst size/type; and the address value 290. In addition, the transaction request 284 includes a preempt value tag 292. This tag value directly indicates the length of the critical section of the burst, and this can be read by the arbitration devices at bus nodes in the bus fabric, or at the memory resource itself, and can be used by the preemption mechanism to determine the point at which the data burst should be split. Where the transaction request already contains an indication of the length of the burst, the tag value can indicate the length of the critical section either in absolute terms or as a fraction of the burst length.

The tag value can be derived by the host, or cache, in one of several ways. For example, it can be a fixed value pre-determined at compilation and added to the code, and then used to set the tag for a group of transactions within an address region. As another example, it can de determined by a monitor process, such a memory management unit (MMU) or snoop logic, measuring the activity of the software and setting the tag so as to optimize its operation. In multicore processors with snoop logic on the L1 cache, the logic can be used to maintain actively the preemption value for lines previously ejected or moved between L1 caches. As another example, the tag value can be derived from the wrapping point of the critical word first mechanism. That is, the whole of the transaction before the wrapping point is regarded as the critical section.

Where a host tags a data request with an indication of the length of the critical section of the transaction in this way, the resource can then use this tag. Firstly, the resource can use the tag value to resolve any contentions between this data transaction and other data transactions, processing the critical sections of the transactions before their non-critical sections as described above. Secondly, the resource can include this tag, or a modified version of it, in the data that is returned to the host. The tag added at the resource can then be read in the arbitration points of the bus fabric to determine the split point in transactions. Again, the arbitration points can then use this split point in the manner described with reference to FIG. 6, or in an alternative way.

This method is static because the value is applied in advance based on some estimation of the size of the critical section.

Figure 12:
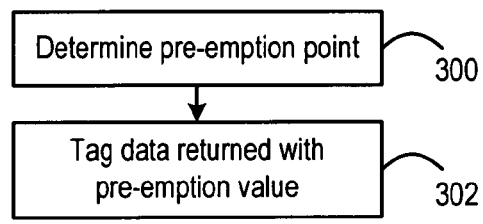
FIG. 12 is a flow chart illustrating an alternative method performed in a device in the system of FIG. 1.

In a second possibility, illustrated in FIG. 12, the length of the critical section is statically determined at the resource, for example at a memory controller associated with the memory device from which the data is being retrieved, and the retrieved data returned to a host processor or CPU is tagged with a pre-emption value. As shown in step 300, the pre-emption point, that is, the point immediately after the critical section, is determined. Then, in step 302, the returned data is tagged with this preemption value.

The pre-emption value can either be a pre-programmed static value, set by a host CPU for that memory region, or it can be based on monitoring and optimization by the advanced memory controller. An additional possibility with the memory controller is to split the burst from a single request into two smaller bursts with low and high priorities.

The tag added at the resource can then be read in the arbitration points of the bus fabric to determine the split point in transactions. Existing memory controllers and bus fabrics can be adapted to use this method.

Figure 13:
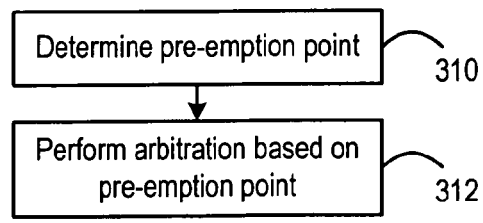
FIG. 13 is a flow chart illustrating as further alternative method performed in a device in the system of FIG. 1.

In a third possibility, illustrated in FIG. 13, the length of the critical section is determined in a distributed fashion at the points of arbitration within an existing bus fabric.

In step 310, the arbitration point determines the preemption point in a transaction and then, in step 312, the arbitration point performs arbitration based on the preemption point. This arbitration can for example be performed according to the method illustrated in FIG. 6.

For example, each bus input in the arbiter may be assigned a predetermined preempt value, programmed by the host in the same way as a priority value may be assigned for arbitration. The host may set this value as required by the application to optimize the traffic, and the value will then be fixed for all bus transactions on that path in the bus fabric.

There has thus been described by way of example the operation of the contention resolution system at one particular point in a system at which there is contention for resources.

However, it will be appreciated that the contention resolution system can be applied at many points in en embedded system of the type shown in FIG. 1. In particular, when a tag indicating a length of a critical section is applied at a source of a transaction, or at one contention point in the system, this tag is included as the transaction is passed from point to point. However, any component receiving the transaction, or any arbitration device at any contention point receiving the transaction, can modify the tag as it sees fit.

Although the contention resolution system has been described so far with reference to an example in which transactions can be split into critical sections and non-critical sections, it is also possible that transactions can be split into more than two sections. For example, based on the criteria described above, a transaction can be split into a critical section, a less critical section, and a non-critical section, with these three sections being handled appropriately.

The invention claimed is:

1. An arbitration device, for resolving contention between data bursts in a data transfer system, the arbitration device being configured to resolve contention between the data bursts by:
   selecting a first one of the contending data bursts;
   determining a length of a critical section of the first selected data burst;
   processing the critical section of the selected data burst;
   selecting a second one of the contending data bursts;
   determining a length of a critical section of the second selected data burst; and
   processing the critical section of the second selected data burst before processing a non-critical section of the selected data burst,
   wherein the step of determining the length of the critical section of each selected data burst comprises:
   reading a tag included in the selected data burst, the tag indicating the length of the critical section of the selected data burst.

2. The arbitration device of claim 1, wherein each of the contending data bursts is a response to a request.

3. The arbitration device of claim 1, wherein the arbitration device is further configured to:
   modify the tag indicating the length of the critical section of the selected data burst; and
   forward the selected data burst with the modified tag.

4. The arbitration device of claim 1, wherein the arbitration device is further configured to:
   when the critical section of the selected data burst has been processed, force the non-critical section of the selected data burst to wait while processing the critical section of the other of the contending data bursts;
   while the non-critical section of the selected data burst is being forced to wait, maintain a count of a number of other data bursts that are processed; and
   when the count reaches a predetermined threshold, prioritize the non-critical section of the selected data burst.

5. The arbitration device of claim 1, comprising at least one memory for storing pointers to received data bursts.

6. A memory controller, comprising the arbitration device of claim 1.

7. A bus arbitration device, comprising the arbitration device of claim 1.

8. An arbitration device, for resolving contention between data bursts in a data transfer system, the arbitration device being configured to resolve contention between the data bursts by:
   selecting a first one of the contending data bursts;
   determining a length of a critical section of the first selected data burst;
   processing the critical section of the selected data burst;
   selecting a second one of the contending data bursts;
   determining a length of a critical section of the second selected data burst; and
   processing the critical section of the second selected data burst before processing a non-critical section of the selected data burst,
   wherein the step of determining the length of the critical section of each selected data burst comprises:
   determining the length of the critical section of the selected data burst based on properties of the selected data burst; and
   including in the data burst a tag indicating the length of the critical section of the data burst.

9. The arbitration device of claim 8, wherein each of the contending data bursts is a response to a request.

10. The arbitration device of claim 8, wherein the arbitration device is further configured to:
    when the critical section of the selected data burst has been processed, force the non-critical section of the selected data burst to wait while processing the critical section of the other of the contending data bursts;
    while the non-critical section of the selected data burst is being forced to wait, maintain a count of a number of other data bursts that are processed; and
    when the count reaches a predetermined threshold, prioritize the non-critical section of the selected data burst.

11. The arbitration device of claim 8, comprising at least one memory for storing pointers to received data bursts.

12. A memory controller, comprising the arbitration device of claim 8.

13. A bus arbitration device, comprising the arbitration device of claim 8.

14. An embedded system, comprising a plurality of data requesting devices, a plurality of data sources and a bus fabric interconnecting the data requesting devices and the data sources, wherein the bus fabric comprises a plurality of bus components, and wherein said bus components have associated therewith respective arbitration devices, each arbitration device being configured to resolve contention between data bursts by:
    selecting a first one of the contending data bursts;
    determining a length of a critical section of the first selected data burst;
    processing the critical section of the selected data burst;
    selecting a second one of the contending data bursts;
    determining a length of a critical section of the second selected data burst; and
    processing the critical section of the second selected data burst before processing a non-critical section of the selected data burst,
    wherein the step of determining the length of the critical section of each selected data burst comprises:
    reading a tag included in the selected data burst, the tag indicating the length of the critical section of the selected data burst.

15. The embedded system of claim 14, wherein each of the contending data bursts is a response to a request.

16. The embedded system of claim 14, wherein at least one of the arbitration devices is configured to:
- modify the tag indicating the length of the critical section of the selected data burst; and
- forward the selected data burst with the modified tag.

17. The embedded system of claim 14, wherein at least one of the arbitration devices is further configured to:
- when the critical section of the selected data burst has been processed, force the non-critical section of the selected data burst to wait while processing the critical section of the other of the contending data bursts;
- while the non-critical section of the selected data burst is being forced to wait, maintain a count of a number of other data bursts that are processed; and
- when the count reaches a predetermined threshold, prioritize the non-critical section of the selected data burst.

18. An embedded system, comprising a plurality of data requesting devices, a plurality of data sources and a bus fabric interconnecting the data requesting devices and the data sources, wherein the bus fabric comprises a plurality of bus components, and wherein said bus components have associated therewith respective arbitration devices, each arbitration device being configured to resolve contention between data bursts by:
- selecting a first one of the contending data bursts;
- determining a length of a critical section of the first selected data burst;
- processing the critical section of the selected data burst;
- selecting a second one of the contending data bursts;
- determining a length of a critical section of the second selected data burst; and
- processing the critical section of the second selected data burst before processing a non-critical section of the selected data burst, wherein the step of determining the length of the critical section of each selected data burst comprises:
- determining the length of the critical section of the selected data burst based on properties of the selected data burst; and
- including in the data burst a tag indicating the length of the critical section of the data burst.

19. The embedded system of claim 18, wherein each of the contending data bursts is a response to a request.

20. The embedded system of claim 18, wherein at least one of the arbitration devices is further configured to:
- when the critical section of the selected data burst has been processed, force the non-critical section of the selected data burst to wait while processing the critical section of the other of the contending data bursts;
- while the non-critical section of the selected data burst is being forced to wait, maintain a count of a number of other data bursts that are processed; and
- when the count reaches a predetermined threshold, prioritize the non-critical section of the selected data burst,
- performed in a data source, the method comprising, as a preliminary step:
- receiving a plurality of requests for data; and forming the contending data bursts in response to respective requests for data.

* * * * *

UNITED STATES PATENT AND TRADEMARK OFFICE
CERTIFICATE OF CORRECTION

PATENT NO. : 9,727,497 B2
APPLICATION NO. : 15/163001
DATED : August 8, 2017
INVENTOR(S) : Rowan Nigel Naylor Page 1 of 1

It is certified that error appears in the above-identified patent and that said Letters Patent is hereby corrected as shown below:

In the Specification

In Column 1, Line 36, delete "a" and insert -- as --, therefor.

In Column 5, Line 58, delete "output path 120" and insert -- output path 122 --, therefor.

In Column 9, Line 15, delete "reaches cache" and insert -- reaches a cache --, therefor.

In Column 10, Line 9, delete "can de" and insert -- can be --, therefor.

In Column 11, Line 8, delete "en embedded" and insert -- an embedded --, therefor.

Signed and Sealed this
Thirty-first Day of December, 2019

Andrei Iancu
*Director of the United States Patent and Trademark Office*